R. E. HELLMUND.
CONTROL SYSTEM.
APPLICATION FILED JAN. 23, 1915.
1,251,659.
Patented Jan. 1, 1918.
2 SHEETS—SHEET 1.
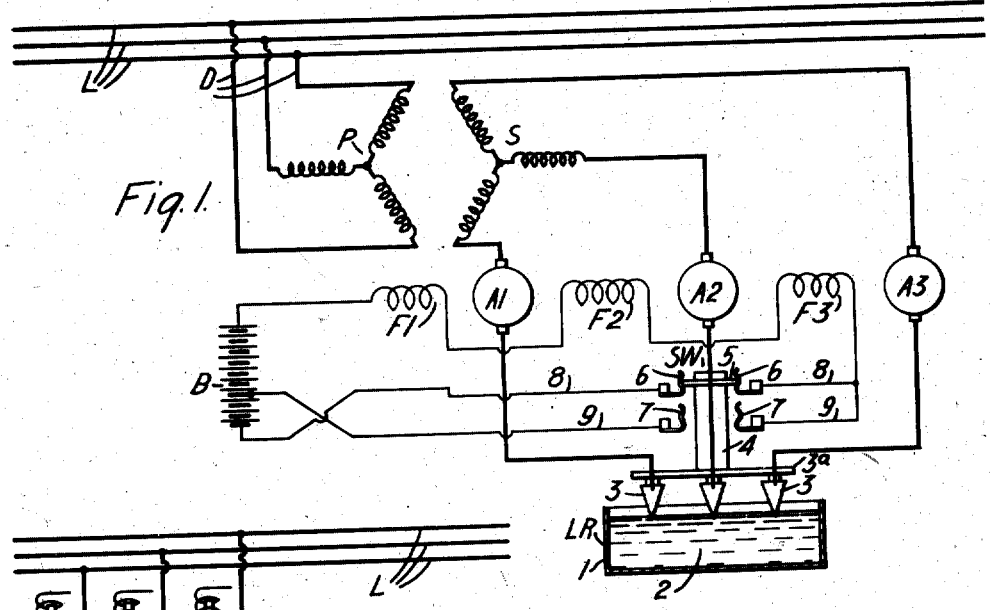
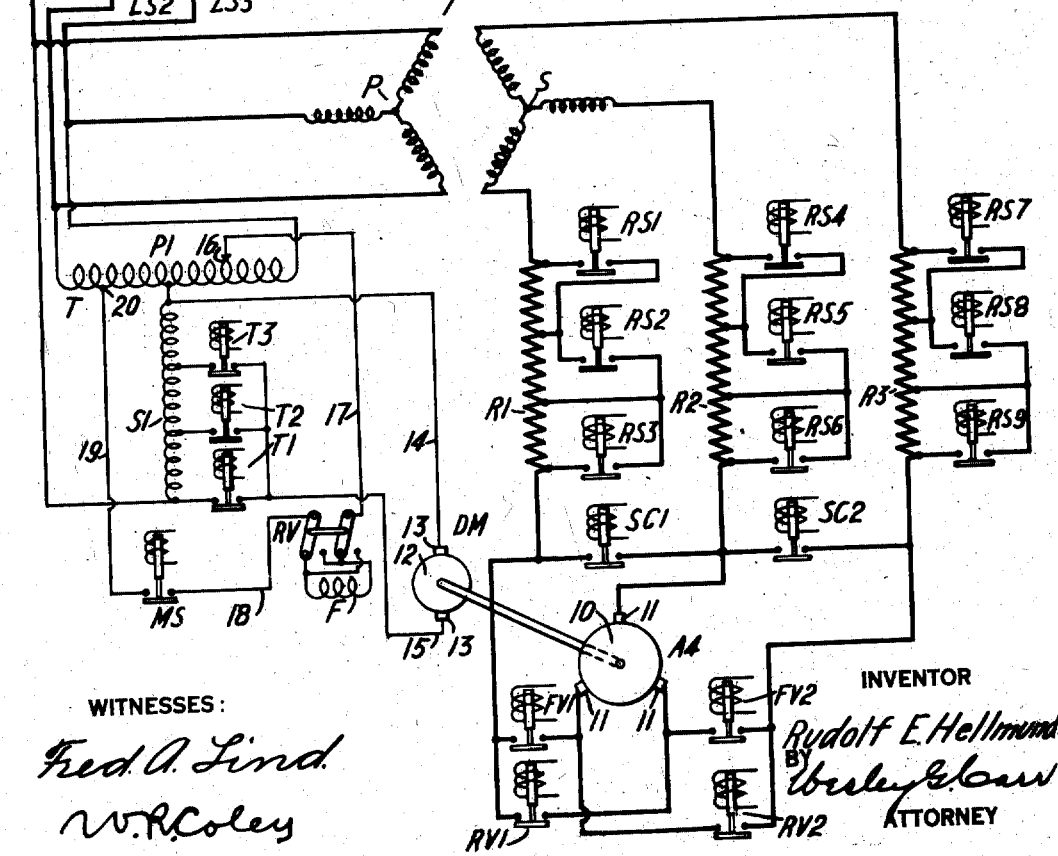
WITNESSES:
Fred A. Lind.
W. R. Coley
INVENTOR
Rudolf E. Hellmund
BY Wesley G. Carr
ATTORNEY

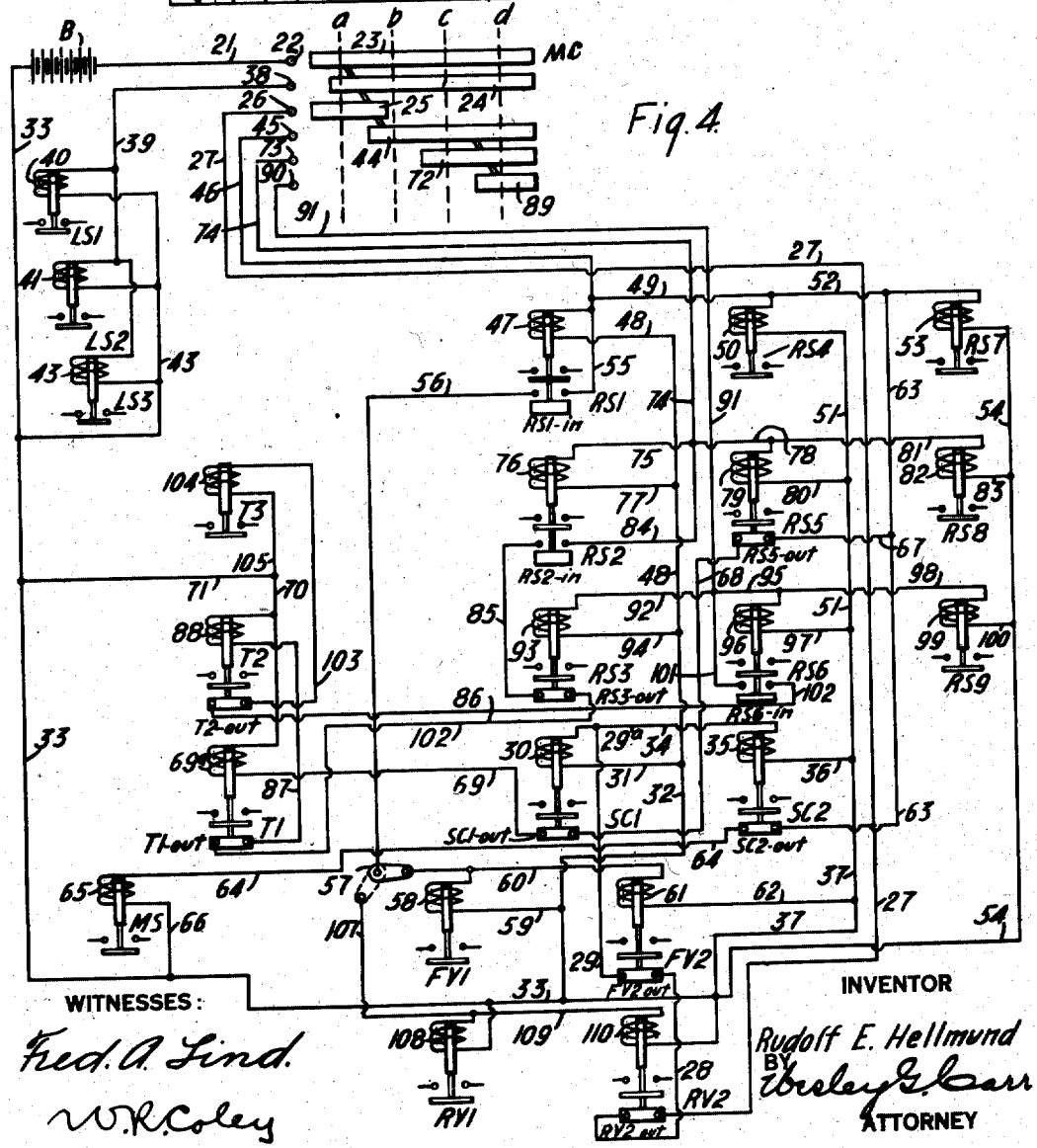

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,251,659.   Specification of Letters Patent.   Patented Jan. 1, 1918.

Application filed January 23, 1915. Serial No. 3,918.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Control Systems, of which the following is a specification.

My invention relates to systems of control for electric motors, and it has special reference to the phase regulation of induction motors and the like.

The object of my invention is to provide a phase-advancing system for induction motors which shall be simple and effective in operation and which shall render such systems more flexible in operation than has been the case hitherto.

More specifically stated, it is the object of my invention to provide means whereby the phase-regulating effect, in systems of the above-indicated character, is automatically and correspondingly varied with a variation of resistance in the secondary-winding circuit of an induction motor, thus producing a proper degree of phase-compensation under all conditions of induction-motor load.

In the prior art, various well-known types of phase-advancers have been employed for the familiar purpose of improving the power-factor of an induction motor or of a distribution system. However, all such devices have been designed to effect proper phase-compensation in the particular control system for one given value of secondary-winding-circuit resistance. A certain limitation has thus been inherently imposed upon the utility of such devices. For example, in electric railway systems of the type that employ propelling induction motors, it is often necessary or desirable to insert a permanent variable resistor in the secondary circuits of certain motors, in order to compensate for differences in the diameters of the vehicle wheels. In such a case, it will be observed that the above-mentioned phase-regulating devices are not adapted to meet the operating conditions of variable secondary-circuit resistance.

According to my present invention, therefore, I provide a phase-advancing system for induction motors wherein the phase-regulating effect is varied in accordance with the variation of resistance in the secondary-winding circuit. To accomplish the desired result, I employ a means that is varied in accordance with the switching means governing the secondary-circuit resistance for correspondingly varying the phase-regulating effect in predetermined direct proportion to the value of active secondary-winding-circuit resistance.

In the accompanying drawing, Figure 1 is a diagrammatic view of a system of control embodying my invention; Fig. 2 is a diagrammatic view of the main circuits of a modified system of control arranged in accordance with my invention; Fig. 3 is a sequence chart of well-known form for indicating the sequence of operation of the various switches that are illustrated in Fig. 2; and Fig. 4 is a diagrammatic view of an auxiliary control system for manipulating the main-circuit connections of Fig. 2 in accordance with the sequence chart of Fig. 3.

Referring to Fig. 1 of the drawings, the system here shown comprises a suitable supply circuit having a plurality of phase-conductors L; a polyphase induction motor having a primary winding P that is suitably connected to the supply circuit by a plurality of distributing conductors D and having a polyphase wound rotor S; a plurality of associated armatures $A^1$, $A^2$, and $A^3$ and respectively coöperating field-magnet windings $F^1$, $F^2$ and $F^3$; a source of direct-current energy, such as a storage battery B, for energizing the field-magnet windings; a suitable resistor, such as a liquid resistor LR, that is disposed in circuit with the armatures $A^1$, $A^2$ and $A^3$ and the respective phase windings of the rotor S of the induction motor; and a switching device SW that is associated with the liquid rheostat LR and the field-magnet windings, in a manner to be described.

It will be observed that the system here shown discloses my invention in connection with a "Kapp vibrator", which is employed in some cases for regulating the phase relations of induction motors, as will be known to those skilled in the art, and as described in British Patent 24823 of 1911. The purpose of the system illustrated, as hereinbefore explained, is to increase the flexibility of the Kapp vibrator system by providing means for permitting correct phase compensation with varying values of secondary-circuit resistance.

The liquid rheostat LR may comprise an incasing member or tank 1 within which is disposed a body of suitable electrolyte 2; and a plurality of suitable electrodes 3 for introducing, in conjunction with the electrolyte 2, a balanced polyphase resistance in the circuit of the secondary winding of the induction motor. The electrodes 3 are mounted upon a suitable supporting and insulating member $3^a$ that is provided with an upwardly extending rod or standard 4 of insulating material. The switching device SW comprises a movable contact member 5 that is suitably and rigidly secured to the standard 4, a set of coöperating stationary contact members 6 that are connected, by conductors 8, between one end of the field-magnet-winding circuit and a terminal of the battery B; and a second set of coöperating stationary contact members 7 that are connected, by a conductor 9, between the same end of the field-circuit and an intermediate point of the battery B.

Assuming the circuit connections to be as just described, the operation of the system may be set forth as follows: If the electrodes 3 of the liquid rheostat extend just below the surface of the electrolyte 2, a relatively great resistance is inserted in the secondary-winding circuit and, at this time, the field-magnet windings $F^1$, $F^2$ and $F^3$ are energized by the full electromotive force of the battery B through coöperating contact members 5 and 6 and conductors 8. Simultaneously, the several armatures $A^1$, $A^2$ and $A^3$ receive an alternating current from the secondary winding S of the induction motor, with the resultant effect that the armatures successively rotate in one direction during a half-cycle of the alternating current and then rotate in the opposite direction during the other half of each cycle. The resultant phase compensation is effected in a manner that is deemed to be sufficiently well known to make further description unnecessary. As the electrodes 3 are further immersed in the electrolyte 2 by means of any familiar and well-known mechanism (not shown) the movable contact member 5 will disengage the stationary contact members 6 and will immediately make contact with the contact member 7, whereby energization of the field-magnet windings $F^1$, $F^2$ and $F^3$ is reduced to a predetermined amount.

In this way, when the current in the secondary winding S of the induction motor is relatively low, that is, when the electrodes 3 extend just below the surface of the electrolyte 2, the phase-compensating effect of the several armatures $A^1$, $A^2$ and $A^3$ is relatively great, thereby affording proper phase regulation under the assumed conditions of load and speed of the main induction motor. When the electrodes 3 occupy their final low-resistance position, whereby the secondary winding S of the induction motor is substantially short-circuited, the energization of the field magnet windings $F^1$, $F^2$ and $F^3$ is correspondingly weakened by reason of the change in battery connections, and the regulating effect afforded by the armatures $A^1$, $A^2$ and $A^3$ is proportionately decreased to prevent over-compensation of the induction motor at its final running speed. It will be understood that more than one change in battery-circuit connections may be employed, if desired.

Reference may now be had to Fig. 2 which shows a system comprising the polyphase supply-circuit conductors L; the main induction motor having primary and secondary windings P and S, respectively; a plurality of resistors $R^1$, $R^2$ and $R^3$ that are respectively connected in the circuits of the phase windings of the secondary winding S; a phase-advancer $A^4$ of the well-known rotary type that is suitably connected to the secondary winding S through the several resistors $R^1$, $R^2$ and $R^3$; an auxiliary driving motor DM for the phase-advancer $A^4$; a T-connected transformer T for supplying energy to the auxiliary driving motor DM; a plurality of switches $LS^1$, $LS^2$ and $LS^3$ for connecting phase conductors L to the primary winding P of the induction motor; a plurality of resistor-short-circuiting switches $RS^1$, $RS^2$ and $RS^3$ that are associated with the resistor $R^1$; a plurality of similar switches $RS^4$, $RS^5$ and $RS^6$ for varying the active value of the resistor $R^2$; a third set of similar switches $RS^7$, $RS^8$ and $RS^9$ that are adapted to control the circuit connections of the resistor $R^3$; a plurality of short-circuit switches $SC^1$ and $SC^2$ for short-circuiting the phase-advancer $A^4$ under starting conditions of the induction motor, for a well-known purpose; a plurality of reversing switches $FV^1$, $FV^2$, $RV^1$ and $RV^2$, the first two being adapted to effect a "forward" operation of the phase-advancer $A^4$ and the latter two being adapted to effect a "reversed" rotation of the advancer; a reversing switch RV for reversing the electrical relations of the armature and the field-magnet winding of the auxiliary driving motor DM, a switch MS for connecting the field-magnet winding of the auxiliary driving motor to the primary winding $P^1$ of the transformer T; and a plurality of switches $T^1$, $T^2$ and $T^3$ for varying the active amount of the secondary winding $S^1$ of the transformer T that is in circuit with the armature of the auxiliary motor.

The rotary phase advancer $A^4$ comprises a rotatable armature 10 of the commutator-type that is provided with a plurality of brushes 11 which are respectively connected to the resistors $R^1$, $R^2$ and $R^3$. The driving motor DM is also preferably of the commutator-type, comprising an armature 12 which is connected through a plurality of brushes 13 and conductors 14 and 15 to the ends of the winding $S^1$ of the transformer T. The circuit of the field-magnet winding F of the auxiliary driving motor extends from an intermediate point 16 of the winding $P^1$ of the transformer T through conductor 17, the reversing switch RV, the field winding F, conductor 18, contact members of the switch MS, when closed, and conductor 19 to a second intermediate point 20 of the transformer winding $P^1$.

The operation of the auxiliary driving motor DM may be described as follows: The armature winding 12 of the motor being relatively non-inductive, when compared with the field-magnet winding F, the armature current lags behind the electromotive force impressed upon the brushes 13 from the transformer winding $S^1$ by a relatively small angle. On the other hand, the current traversing the field-magnet winding F from the winding $P^1$, which is disposed in quadrature relation to the secondary winding $S^1$, lags approximately 90° behind the electromotive force impressed upon the field winding, by reason of the relatively high inductance thereof. As a result, the field and armature currents are substantially in phase, and proper relations are obtained for satisfactory operation of the motor. In the system shown, the field-winding energization of the auxiliary driving motor is substantially constant, where as the voltage impressed upon the armature 12 may be varied by manipulating switches $T^1$, $T^2$ and $T^3$; however, it will be understood that these relations may be reversed, so that the speed of the auxiliary driving motor may be varied by variation in the field strength thereof.

Referring now to Fig. 4, the auxiliary control system illustrated comprises a master controller MC that is adapted to assume a plurality of operative positions $a$, $b$, $c$ and $d$; the battery B or other suitable source of energy; and a plurality of electrical interlocks that are associated with, and movable by, the various main circuit switches, in a well-known manner.

Assuming the master controller MC to be moved from its "off" to its first operative position $a$, the operation of the auxiliary control system may be described as follows:

A circuit is first established from one terminal of the battery B through conductor 21, control finger 22, contact segments 23 and 25 and control finger 26 of the master controller, conductor 27, interlock $RV^2$—out, conductor 28, interlock $FV^2$—out, and conductor 29 to a point $29^a$ where the circuit divides, one branch including actuating coil 30 of the switch $CS^1$, conductors 31 and 32, and the other branch including conductor 34, actuating coil 35 of the switch $SC^2$ and conductors 36 and 37, the conductors 32 and 37 being connected to a common conductor 33 which makes connection with the negative terminal of the battery B. The switches $SC^1$ and $SC^2$ are thus initially closed to short-circuit the phase advancer for the purpose of preventing any sparking in the advancer, which might be caused by reason of the relatively high frequency of the starting currents of the induction motor secondary winding S.

Another circuit is then established from the energized contact segment 24, through control finger 38, conductor 39, the parallel-connected actuating coils 40, 41, and 42 of the switches $LS^1$, $LS^2$ and $LS^3$, and conductor 43 to the negative battery conductor 33.

The induction motor is thus connected to the circuit with all of the secondary circuit resistance active.

When the master controller is moved to its second operative position $b$, an energized contact segment 44 engages a control finger 45, from which point circuit is completed through conductor 46, actuating coil 47 of the resistor-short-circuiting switch $RS^1$ and conductors 48, 32 and 33 to the negative side of the battery B. Simultaneously, circuits are established from conductor 46 through conductor 49, actuating coil 50 of the switch $RS^4$ and conductors 51, 37 and 33, and from conductor 49 through conductor 52, actuating coil 53 of the switch $RS^7$ and conductors 54, and 33. As soon as the switch $RS^1$ is closed, another circuit is established from conductor 46 to conductor 55, interlock $RS^1$—in, conductor 56, a two-way switch 57, actuating coil 58 of the switch $FV^1$ and conductor 59 to the negative conductor 33, and also from the switch 57 through conductor 60, the actuating coil 61, of the switch $FV^2$ and conductor 62 to conductors 37 and 33. The segment 25 breaks contact with the finger 26 just before the "b" position is reached, thus opening the switches $SC^1$ and $SC^2$. The segment 25 preferably overlaps the segment 44, as shown, to insure the closing of the switches $RS^1$, $RS^4$ and $RS^7$ before the opening of the short-circuiting switches. The short-circuit of the phase-advancer is thus removed to permit of the usual phase regulation as soon as the advancer is started into operation as about to be described.

The switches $RS^1$, $RS^4$ and $RS^7$ are thus closed to short-circuit a predetermined portion of the resistors $R^1$, $R^2$ and $R^3$ and to effect a predetermined acceleration of the main induction motor.

Another circuit is then established from conductor 52 through conductor 63, interlock $SC^2$—out, conductor 64, actuating coil 65 of the switch MS and conductor 66 to the negative conductor 33.

A circuit is at the same time established from conductor 63 through conductor 67, interlock $RS^5$—out, conductor 68, interlock SC¹—out, conductor 69, the actuating coil 69ª of the driving-motor regulating switch T¹ and conductors 70 and 71 to the negative conductor 33. The armature circuit of the auxiliary driving motor DM is thus completed across the secondary transformer winding S¹, and the driving motor will accelerate the phase-advancer A⁴ to its initial and highest operating speed, which affords correct phase-compensation under the assumed conditions of load and speed of the induction motor.

If the master controller is moved to its third operative position $c$, a circuit is established from an energized contact segment 72 through control finger 73, conductors 74 and 75, the actuating coil 76 of the resistor-short-circuiting switch RS² and conductor 77 to the negative-potential conductor 48. Simultaneously, the switches RS⁵ and RS⁶ are closed by reason of the energization of the coils 79 and 82 of the respective switches through conductors 78 and 80, and 81 and 83, respectively, circuit being completed through the negative battery conductor 33, in the usual manner. The closure of the switch RS⁵ effects the opening of the switch T¹ by reason of the exclusion from the control circuit of the switch T¹ of the interlock RS⁵—out. Concurrently with the operation just described, another circuit is established from conductor 74 through conductor 84, interlock RS²—in, conductor 85, interlock RS⁶—out, conductor 86, interlock T¹—out, conductor 87, and the energizing coil 88 of the switch T² to the conductor 70. The switch T² is thus closed substantially as soon as the switch T¹ opens, but no short-circuit of the transformer winding S¹ occurs.

If the master controller MC is moved to its final operative position $d$, a circuit is first established from an energized contact segment 89, through control finger 90, conductors 91 and 92, energizing coil 93 of the switch RS² and conductor 94 to the conductor 48. Simultaneously, the energizing coils 96 and 99 of the switches RS⁶ and RS⁹ are energized through conductors 95 and 97, and 98 and 100, respectively. The switch T² is then opened by reason of the exclusion from its control circuit of the interlock RS³—out.

A circuit is then established from conductor 91 through conductor 101, interlock RS⁶—in, conductor 102, interlock T²—out, conductor 103, energizing coil 104 of the switch T³ and conductors 105, 71 and 33 to the negative battery terminal.

It will be observed that, with a relatively high resistance in the secondary circuit of the induction motor, the voltage impressed upon the auxiliary driving motor DM assumes its highest value and, consequently, the phase advancer will run at its highest speed and its effect will be correct for the induction motor under the assumed conditions. As the secondary circuit resistance is subsequently decreased, the voltage impressed upon the driving motor DM is correspondingly reduced and the resultant effect on the phase-advancer is such as to produce proper compensation under the new speed conditions of the induction motor.

Assuming that the induction motor is running above the synchronous speed that corresponds to the frequency of the supply circuit conductors L and that it is desired to regeneratively brake the driven vehicle by returning energy to the supply circuit, the desired result may be accomplished as follows:

The master controller MC is first returned to its "off" position to effect the opening of all circuit switches, and steps are taken to reverse the effect of the phase-advancer A⁴, as is necessary when the induction motor is to operate as an asynchronous generator. The preferred method involves the actuation of the switch 57 to the position shown in dotted lines, whereupon, provided the conductor 56 is energized, circuit is completed therefrom through the switch 57 in its new position, conductor 107, actuating coil 108 of the switch RV¹ to the negative conductor 33, and also from the conductor 107 through conductor 109 and the actuating coil 110 of the switch RV² to the conductor 33.

When this method has been employed to effect reversal of the phase-regulating effect of the phase advancer A⁴, the master controller MC may be successively moved through its operative positions in a manner similar to that hereinbefore described; the operation being identical, with the single exception that the switches RV¹ and RV² are substituted for the switches FV¹ and FV², respectively, in case the line switch 57 has been actuated to the dotted-line position. Regeneration to the supply circuit may thus be effected so long as the speed of the induction motor remains greater than the above-mentioned synchronous speed, and the phase-regulating effect of the phase-advancer A⁴ will be varied in accordance with the changes in the secondary-circuit resistance of the induction motor, in a similar manner to that described in connection with the acceleration of the induction motor.

For mechanical convenience, it is desirable to be able to control the direction of rotation of the phase-converter and driving motor and, for this purpose, I equip the field F of the driving motor DM with a reversing switch RV. Obviously, a reversal in the direction of rotation of the set involves a reversal in the phase order of the converter and it is accordingly necessary, if, for example, continuous motor operation is desirable, to interchange two leads of the converter, as above described, when reversing the driving motor DM.

I do not wish to be restricted to the specific circuit connections and arrangement of parts herein set forth, as various modifications thereof may be effected within the spirit and scope of my invention. I desire, therefore, that only such limitations shall be imposed as are indicated in the appended claims.

I claim as my invention:

1. In a system of control, the combination with an induction motor having a primary and a secondary winding, of a phase-advancing machine disposed to energize said secondary winding, a driving motor for said machine, switching means for varying the resistance of the secondary winding circuits, speed-regulating connections for said driving motor, and means energized in accordance with said switching means for varying said connections.

2. In a system of control, the combination with an induction motor having a primary and a secondary winding, of a phase-advancing machine disposed to energize said secondary winding a driving motor for said machine, switching means for varying the resistance of the secondary winding circuits, speed-regulating connections for said driving motor, and conducting means energized in accordance with said switching means for changing said connections to vary the phase-regulating effect of said machine in predetermined direct proportion to the value of active secondary winding-circuit resistance.

3. In a system of control, the combination with an induction motor having primary and secondary windings, of a phase-advancing dynamo-electric machine connected to said secondary winding, driving means for said machine, means for inserting different amounts of resistance in circuit with said secondary winding, and means for controlling the speed of said driving means in accordance with the adjustment of said resistance-controlling means.

4. In a system of control, the combination with an induction motor having primary and secondary windings, of a phase-advancing dynamo-electric machine connected to said secondary winding, driving means for said machine, means for inserting different amounts of resistance in circuit with said secondary winding, and means for controlling the speed of said driving means to vary the phase-regulating effect of said machine in predetermined direct proportion to the value of active secondary-winding-circuit resistance.

5. In a system of control, the combination with an induction machine having primary and secondary windings and subject to operation either as a motor or as a generator, of a phase-advancing dynamo-electric machine connected to said secondary winding, driving means for said machine, means for inserting different amounts of resistance in circuit with said secondary winding, means for controlling the speed of said driving means in accordance with the adjustment of said resistance-controlling means, and means whereby the phase order of said phase advancer may be reversed when said induction machine reverses in function.

6. In a system of control, the combination with an induction machine having primary and secondary windings and subject to operation either as a motor or as a generator, of a phase-advancing dynamo-electric machine connected to said secondary winding, driving means for said machine, means for inserting different amounts of resistance in circuit with said secondary winding, means for controlling the speed of said driving means to vary the phase-regulating effect of said machine in predetermined direct proportion to the value of active secondary-winding-circuit resistance, and means whereby the phase order of said phase advancer may be reversed when said induction machine reverses in function.

In testimony whereof, I have hereunto subscribed my name this 21st day of Jan. 1915.

RUDOLF E. HELLMUND.

Witnesses:
J. V. DOBSON,
B. B. HINES.

Copies of this patent may be obtained for five cents each, by addressing the "Commissioner of Patents, Washington, D. C."